United States Patent

Hadley

[11] Patent Number: 5,929,431
[45] Date of Patent: Jul. 27, 1999

[54] OPTICAL TRACKER SYSTEM FOR DETERMINING THE POSITION OF A ROTATING BODY

[75] Inventor: Maxwell Richard Hadley, Lyndhurst, United Kingdom

[73] Assignee: Stewart Hughes Limited, Eastleigh, United Kingdom

[21] Appl. No.: 08/693,277
[22] PCT Filed: Feb. 10, 1995
[86] PCT No.: PCT/GB95/00281
  § 371 Date: Nov. 6, 1996
  § 102(e) Date: Nov. 6, 1996
[87] PCT Pub. No.: WO95/21765
  PCT Pub. Date: Aug. 17, 1995

[30] Foreign Application Priority Data

Feb. 11, 1994 [GB] United Kingdom ............... 9402705

[51] Int. Cl.⁶ ............... B64C 27/00; G01V 8/00; G01D 5/26
[52] U.S. Cl. ............... 250/206.1; 250/214 A; 250/214 AG; 250/231.13; 73/655
[58] Field of Search ............... 250/206.1, 206.2, 250/208.2, 231.13, 221, 222.1, 214 R, 214 A, 214 AG, 214 AC, 214 B, 214 C; 73/655; 324/76.77, 76.83

[56] References Cited

U.S. PATENT DOCUMENTS

| | | |
|---|---|---|
| 2,960,908 | 11/1960 | Willits et al. ............... 88/14 |
| 3,002,420 | 10/1961 | Willits et al. ............... 88/14 |
| 3,023,317 | 2/1962 | Willits et al. . |
| 3,938,762 | 2/1976 | Murphy ............... 73/455 |
| 4,529,874 | 7/1985 | Zierhut ............... 250/221 |
| 4,617,569 | 10/1986 | Lotoquart ............... 342/412 |
| 4,812,643 | 3/1989 | Talbot ............... 250/222.1 |
| 5,249,470 | 10/1993 | Hadley et al. ............... 73/655 |
| 5,253,531 | 10/1993 | Walker et al. ............... 73/650 |

FOREIGN PATENT DOCUMENTS

| | | |
|---|---|---|
| 02208399 | 1/1987 | European Pat. Off. . |
| 1023487 | 10/1965 | United Kingdom . |
| 1008200 | 3/1966 | United Kingdom . |
| 1411548 | 10/1975 | United Kingdom . |
| 2047886 | 12/1980 | United Kingdom . |
| 2076606 | 12/1981 | United Kingdom . |

*Primary Examiner*—Edward P. Westin
*Assistant Examiner*—John R Lee
*Attorney, Agent, or Firm*—Irwin Ostroff; Erwin Pfeifle

[57] ABSTRACT

An optical tracker system comprises an optical sensor 1 and associated signal processing circuitry 12, 24 for conditioning signals output from the sensor and rejecting signal indicative of false sensor information. A signal rejection circuit 24 comprises a guard time monostable 28 arranged to generate a guard time pulse defining a guard time when a pulse is input from the sensor 1, an output monostable 35 arranged to generate an output pulse in response to the guard time pulse, and an output suppress monostable 30 arranged to suppress the output monostable 35 when a false signal condition occurs during the guard time.

20 Claims, 2 Drawing Sheets

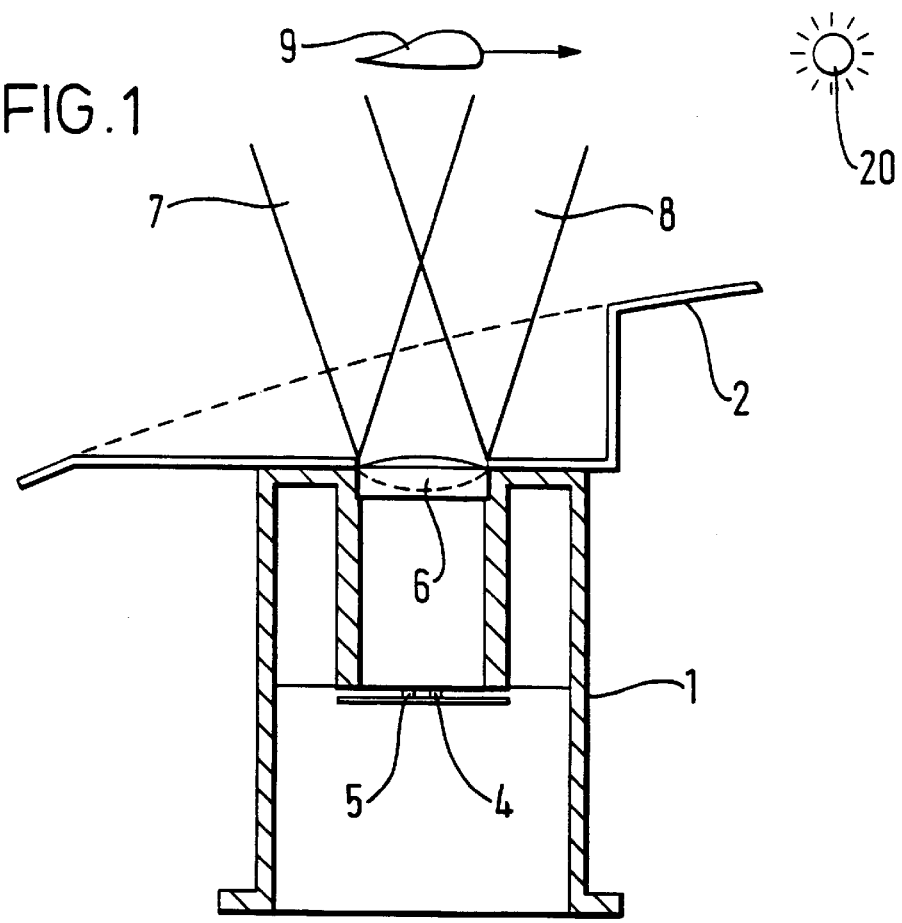

OPTICAL TRACKER SYSTEM FOR DETERMINING THE POSITION OF A ROTATING BODY

FIELD OF THE INVENTION

The invention relates to an optical tracker system.

BACKGROUND OF THE INVENTION

Optical tracker systems are used for tracking a rotating body such as a fan or rotor blade in order to measure the displacement thereof. Optical tracker systems are well known. Among other things, optical tracker systems are used to detect the displacements of helicopter rotors and may be embodied in portable maintenance or test equipment or in a more sophisticated health and usage monitoring system (HUMS). HUMS apparatus is mounted permanently in a helicopter and the optical tracker system associated therewith is used continuously to measure rotor blade displacement during all flight operations of the helicopter. Consequently, a greater performance is required of the optical tracker system since it must function in all normal operating environmental and flight conditions and not just the controlled conditions of a special purpose test flight.

Known optical tracker systems are described in for example U.S. Pat. No. 2,960,908 (Willits et al.), issued on Nov. 22, 1960, U.S. Pat. No. 3,002,420 (Willits et al.), issued on Oct. 3, 1961, U.S. Pat. No. 4,812,643 (Talbot), issued on Mar. 14, 1989, and European Patent Application No. 0 208 399 (Stewart Hughes Limited), priority date of May 16, 1985. The systems described in these publications include an optical sensor comprising a lens and usually at least two light sensing devices such as photodiodes. The lens defines a field of view and as a blade passes through the field of view an image of the blade is formed on the light sensors and is detectable thereby. As the blade passes through the field of view the blade image moves across the photodiodes which produce respective output signals that vary in time and represent the passage of the blade. The time variations in the output signals from the photodetectors can be used to determine the displacement of the rotor blade.

The image formed by the lens comprises the blade and the background and there must be sufficient contrast in the image between the blade and the background in order to be able to distinguish between the two. Optical tracking devices may be used in flight during the day or at night. During the day the background will usually be bright daytime sky and adequate contrast can be achieved by arranging for the portion of the blade that passes through the field of view of the sensor to be much darker than the background. At night, the background will usually be dark night sky and adequate contrast can be achieved by illuminating the blade or a reflective patch mounted to the blade as the blade passes through the field of view of the sensor.

Signals from the sensing device are input to signal processing circuitry where they are analyzed in order to determine the relative position of the blades as they rotate. The processing circuit may be a dedicated electronic circuit or it may be sophisticated computer based circuitry.

While known systems work adequately there is nevertheless a problem associated with various imperfections in the optical sensor which result in stray light arriving at the photodiodes along different optical paths within the optical sensor.

Light scattering within the optical sensor can reduce significantly the contrast between the background image and the blade image. Scattered light is created because of various imperfections in the optical sensor. A small component of light is reflected back out through the entrance of the optical sensor but the majority of the light remains in the optical sensor and must be absorbed in order to avoid the aforementioned reduction in contrast.

One way in which the reflected light can be absorbed is by way of a field or aperture stop. It is not feasible to make a field or aperture stop completely absorbent of reflected light and therefore in practice some portion of the reflected light will remain causing a reduction in the contrast of the image.

The effects of scattered light can be further minimized by ensuring the cleanliness of all optical components and blackening the inside surfaces of the optical sensor. It is also possible to compensate for the reduced contrast electronically by measuring the observed light and dark levels in the image and using this information when deducing the size or shape of the image from the signals output from the light sensors.

Another way of reducing the amount of scattered light is by shielding the lens from undesired light sources using a lens hood. However, it is difficult to achieve this for an optical sensor which is permanently mounted to the body of a helicopter as part of a HUMS apparatus. If a lens hood is mounted on the surface of the helicopter body it will project into the airflow and increase drag which is clearly undesirable. If the lens is mounted at the bottom of a cavity formed in the helicopter body there is a danger that the cavity will fill with water. In both cases there is also an icing hazard and therefore preferably the optical sensor is mounted to the helicopter so that the lens is substantially level with the outer surface of the helicopter body. As a result, during daytime flights the full light of the sun may be incident on the lens which will give rise to a high level of scattered light within the optical sensor.

The brightness of the daytime background sky may be quite low, particularly at high altitudes where the sky is much darker and bluer than near ground levels. Under such circumstances the contrast between the background and foreground blade image will be relatively low. Furthermore, under certain circumstances the level of scattered light incident upon the light sensors from illumination by the sun may equal or even exceed the light level of the background sky. Generally, the rotor blades are positioned above the optical sensor and it is not uncommon as the rotor blades rotate for them to pass between the sun and the optical sensor. Indeed, this can occur even when the field of view of the optical sensor is directed away from the sun. When the shadow of the blade passes between the sensor and the sun, the amount of scattered light entering the sensor is considerably reduced. This significant reduction in scattered light is sensed by the light sensors and converted into a signal which is output therefrom. This signal can be misinterpreted by the processing circuitry as representing the image of a blade passing through the field of view of the sensing system. The processing of the false signal will give rise to an erroneous measurement.

A detection system using photodiode detectors is described in UK Patent Application No. 2,076,606 A (The Solartron Electronic Group Ltd.), published in Dec. 2, 1981. The system is arranged to discriminate between true signals and those resulting from interference. A monostable circuit provides a time window within which true signals are detected and without which interference signals are rejected.

The present invention aims to overcome the aforementioned problems.

SUMMARY OF THE INVENTION

The present invention relates to an optical tracker system.

According to one aspect of the invention there is provided an apparatus for determining the position of a rotating body, the apparatus comprising an optical sensor defining at least two fields of view and arranged to output a pulse signal each time the rotating body passes through one of the fields of view; and a signal processor for rejecting pulse signals output from the sensor during a time period indicative of false rotating body information; and wherein the signal processor comprises timing means for generating a guard pulse defining a guard time representing said time period.

According to another aspect of the invention there is provided a signal processing system operable to receive at least two pulse input signals and to output a signal representative thereof, the processing system being arranged to reject pulses in the two input signals which are spaced by less than a predetermined interval.

The invention also provides a method of processing signals representing the passage of a body past two sensing devices, the method comprising defining a guard time and rejecting signals from the sensing devices which occur within the guard time.

The above and further features of this invention are set forth with particularity in the appended claims and together with advantages thereof will become clearer from consideration of the following detailed description of an exemplary embodiment of the invention given with reference to the accompanying drawings.

BRIEF DESCRIPTION OF THE DRAWINGS

FIG. 1 is a schematic part sectional view of an optical sensor for an optical tracking system;

FIG. 2 is a timing diagram representing various signals;

DETAILED DESCRIPTION

Figure 3:
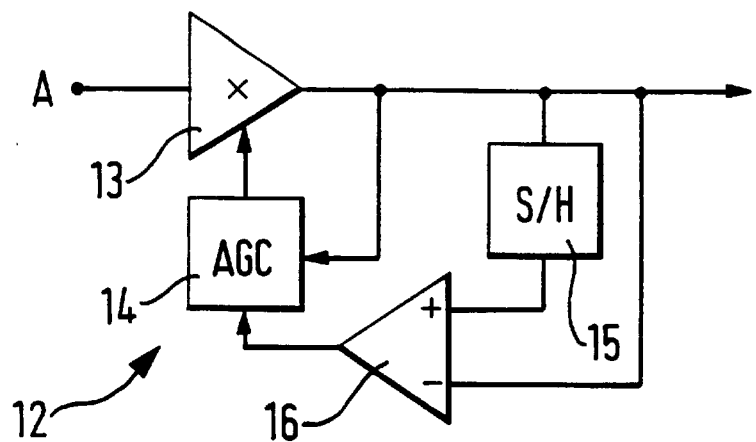
FIG. 3 is a schematic circuit diagram of a signal conditioning circuit.

Turning now to FIG. 1 of the accompanying drawings there is shown an optical tracker sensor 1 mounted in the fuselage 2 of a helicopter. The optical tracker sensor 1 may be permanently fitted to the helicopter as part of a HUMS apparatus and is mounted substantially within the fuselage. The optical sensor 1 comprises two radiation detectors such as low noise photodiodes 4, 5, and a lens 6. The sensor 1 may be similar to the sensor described in European Patent Application No. 0,208,399 (Stewart Hughes Limited), priority date May 16, 1985 and corresponding U.S. Pat. No. 4,812,613 (Talbot), issued on Mar. 14, 1989, the teachings of which are incorporated herein by reference.

The arrangement of the optical sensor 1 is such that each of the two photodiodes 4,5 has a respective field of view 7,8 directed upwardly. During rotation of the helicopter rotor, each of the blades of the rotor, e.g.,. blade 9, pass through the two fields of view 7,8. As the blade 9 passes through each field of view 7,8 an image of the blade 9 is focused on the respective photodiode 4,5. At other times an image of the sky is seen by the photodiodes 4,5. The photodiodes 4,5 output a signal having a value representing the amount of light falling thereon. During daytime operation the signal from a photodiode will have a high value representing the relatively bright background sky and low value representing the relatively dark rotor blade 9.

Exemplary signals from the photodiodes 4,5 are shown as signals A and B in FIG. 2. The pulses and the spacing between the pulses in FIG. 2 are not drawn to scale. A negative pulse 10 is generated in the signal A output from photodiode 4 when the blade 9 passes through the field of view 7 and, at a later time, a negative pulse 11 is similarly generated in the signal B when the blade 9 passes through the field of view 8. The difference in time between the two pulses is an indication of the position of the blade.

The signals A and B from the photodiodes 4, 5 may be conditioned by a signal conditioning circuit before being output for further processing and analysis. A signal conditioning circuit 12 for signal A is shown in FIG. 3 of the accompanying drawings. A similar circuit would of course be provided for signal B. The signal conditioning circuit 12 serves as a level discriminator and comprises a variable gain amplifier 13 and an associated automatic gain control circuit 14 connected to the output of the amplifier 13. The automatic gain control circuit 14 is arranged so as to keep the output signal from the amplifier at a substantially constant level when light from the unobserved sky is incident on the photodiodes 4,5. The level discriminator circuit 12 may further comprise a sample and hold circuit 15 arranged to measure the output signal level of the variable gain amplifier 13 when the sky is obscured by the rotor blade 9, and a comparator 16 arranged to compare the instantaneous output of said variable gain amplifier 13 with a level mid way between the substantially constant bright level and the sampled dark level. In this way the comparator 16 can give a bright or dark output depending on whether the output is greater or less than the mid way level. In an alternative arrangement of the level discriminator circuit 12, the sample and hold circuit 15 and comparator circuitry 16 may be omitted, and the dark level may be assumed always to correspond to a zero signal output from the variable gain amplifier 13.

The time difference between the two pulses 10,11 is determined by the speed of the rotor blade 9, the separation between the two photodiodes 4,5, and the magnification of the lens 6 as determined by the characteristics of the lens 6 and its distance from the photodiodes 4,5 and from the blade 9. For a typical lens to photodiode distance of 50 mm and lens to rotor blade distance of 2 m, the magnification is 0.025, or 1/40. Thus the image of the blade 9 seen by the photodiodes 4,5 moves at 1/40th of the speed of the blade itself. For a typical blade speed of 200 ms$^{-1}$, and a typical photodiode separation of 10 mm, the image takes about 2 ms to pass from one photodiode to the other. If the lens to rotor blade distance varies, the magnification will also change. This causes the time difference between the two image pulses 10,11 to vary, and it is from this variation that the displacement of the blade can be determined.

If the helicopter is flying at a high altitude, the light level from the sky in the fields of view may be much less than the level of sunlight scattered into the photodiodes 4,5. Under these conditions the amount of scattered light seen by the photodiodes 4,5 may be comparable with the amount of light from the sky.

The sun 20 is shown in FIG. 1 at an arbitrary position in the sky. As the blade 9 passes between the sun 20 and the sensor 1 a shadow of the blade is formed over the lens 6 causing the amount of scattered light in the optical sensor 1 to fall considerably. The effect of this is to cause the value of the signals output from the two photodiodes 4,5 to fall considerably and this is depicted in FIG. 2 by a negative pulse 22 in signal A and a negative pulse 23 in signal B. The negative pulses 10, 11 resulting from the image of the blade 9 shall be referred to hereinafter as blade pulses, and the negative pulses 22, 23 resulting from the shadow of the blade shall be referred to hereinafter as shadow pulses.

Since the sun may be regarded as being at an infinite distance from the helicopter, the shadow of a blade moves at essentially the same speed as the blade itself. In other words, the magnification of the shadow is unity. Hence the time taken for the shadow of the blade to move from one photodiode to the next will be approximately 40 times less than the time taken by the image of the blade 9. In fact, because the shadow pulses 22, 23 are produced by the interruption of light scattered randomly within the optical track sensor 1, they occur almost simultaneously. Also there is no fixed time delay between the signals arising from the image of the blade 9 and the shadow, the delay will depend on the position of the sun with respect to the rotor and optical track sensor 1.

Figure 4:
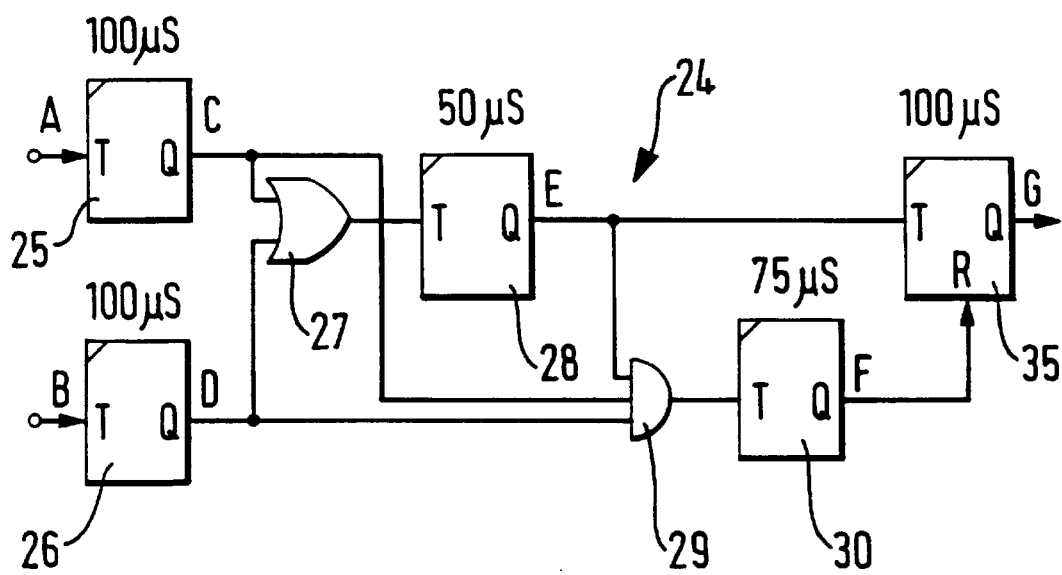
FIG. 4 is a schematic diagram of a circuit for processing signals from the optical sensor of FIG. 1.

In order to avoid the generation of spurious and incorrect blade position data the signals A and B output from the two photodiodes 4, 5, or the conditioned signals representative thereof, are input to a shadow pulse rejection circuit 24 as shown in FIG. 4 of the accompanying drawings. The shadow pulse rejection circuit 24 operates by examining the time difference between output pulses from the two photodiodes 4,5 in order to determine whether the pulses are blade pulses or shadow pulses. The signals A and B from the photodiodes 4, 5 or the conditioned signals from the aforementioned signal conditioning circuitry 12 are input respectively to two monostable circuits 25, 26 which are arranged to detect the trailing edge of a pulse. That is to say, the portion of the photodiode signal corresponding to the dark to light transition of the image is used to trigger the monostable circuits 25, 26. When triggered the monostable circuits 25, 26 each output a pulse of approximately 100 microseconds duration. The outputs of the two input monostables 25, 26 are shown as signals C and D, respectively, in FIG. 2. The output signals C and D are input to an OR gate 27 which outputs a signal that is used to trigger a guard time monostable circuit 28. When triggered the guard time monostable circuit 28 outputs a pulse having a period of approximately 50 microseconds. The signal output from the guard time monostable 28 is represented by signal E in FIG. 2. The period of the guard time monostable circuit 28 defines a guard time, that is to say a minimum period of time for which pulses from the two photodiodes must be separated in order to represent valid data. Dark to light transitions which occur separated by a time period less than this guard time are assumed to be due to scattered light and will be removed.

The signals C, D and E are input to an AND gate 29 which generates an output signal when C, D and E are high. The output from the AND gate 39 is used to trigger an output suppress monostable 30 which has a period of approximately 75 microseconds. Thus, the output suppress monostable circuit 30 is triggered by the logical OR of the outputs of the input monostable circuits 25, 26 and the guard time monostable circuit 28. That is to say the output suppress monostable circuit 30 will be triggered if both input monostable circuits 25, 26 are themselves triggered by photodiode signals A and B within the guard time defined by the guard time monostable circuit 28. The signal output from the output suppress monostable circuit 30 is represented by the signal F in FIG. 2 and it will be noted that signal F contains a pulse 31 only when signals C, D and E contain pulses 32, 33, and 34, respectively. This condition occurs when shadow pulses are present but not when blade pulses are present. If the two photodiode signals A and B change from dark to light with a separation of more than 50 microseconds, a condition which is true for a pair of blade pulses, then the output suppress monostable circuit 30 is not triggered.

An output monostable circuit 35 is connected to be triggered by the signal E output from the guard time monostable 28, in order to output a signal, represented by signal G in FIG. 2, containing a pulse of approximately 100 microseconds duration which is generated at the end of the guard time period defined by the monostable circuit 28. The output monostable circuit 35 has a reset input. The signal F output from the output suppress monostable circuit 30 is applied to the reset input of the output monostable circuit 35 so that the output monostable circuit 35 does not generate an output pulse if it is triggered the guard time monostable circuit 28 when the signals C, D and E are all high.

This means that the output of output monostable circuit 35 is suppressed when photodiode signal dark to light transitions occur separated by less than the guard time. Isolated input signal transitions, for example blade pulses, will generate an output pulse, delayed from the time of occurrence of the transition by the guard time. Since each output pulse is delayed by the same time from the input signal transition, that is to say by the guard time period defined by the monostable circuit 28, the time period between the two pulses 36, 37 of signal G is the same as the period between the two pulses 11, 12 of signals A and B. Thus, the lens to rotor blade distance information, is not affected.

The period of the input monostable circuits 25, 26 should be greater than that of the guard time monostable circuit 28, so that the output suppress monostable circuit 30 is triggered by the logical AND of the three signals C, D and E. The guard time monostable circuit 28 should not be re-triggered until after the end of the period of the input monostable circuit 25, 26. This prevents input pulses separated by more than 50 microseconds but less than 100 microseconds from being rejected (although they will cause the output monostable circuit 35 to generate only a single output pulse). Similarly, the period of the output suppress monostable circuit 30 should be greater than that of the guard time monostable 28, in order that the output monostable circuit 35 be held in a reset condition for longer than the guard time defined by the monostable circuit 28. The time periods of the various monostables 25, 26, 28, 30, and 35 are selected so that period variations arising from component tolerances and temperature drifts or other causes do not violate these requirements.

The angular displacement of the rotor blade 9 with respect to a fixed reference marker on the rotor shaft may be deduced from the time delay between a signal derived from a reference such as a tacho signal and one or both of the output pulses 36, 37 produced in response to input blade pulses. The extra delay introduced by the shadow pulse rejector circuit 25 must be subtracted from the time between the reference signal and the output pulses 36, 37 before calculating the angular displacement. In practice the error introduced by a 50 microsecond delay is generally small enough to be ignored.

The shadow pulse rejection circuit 24 described is useful in rejecting signals arising from scattered sunlight and it also provides the advantage of rejecting any interfering signal which affects both photodiode signals A and B simultaneously. Such interfering signals may be produced by Electro-Magnetic Interference (EMI) or by a pulsed light source, such as the high-intensity strobe lights of the helicopter to which it is fitted, or of other aircraft.

The operation of the shadow pulse rejection circuit 24 has been described with reference to an optical tracker system having two photodiodes 4,5 but it will be apparent to those possessed of the appropriate skills that it may readily be extended to a system having three or more radiation detectors, which may be photodiodes, photomultipliers, or other suitable devices.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

I claim:

1. An apparatus for determining the position of a rotating body, the apparatus comprising:

an optical sensor defining at least two fields of view and arranged to generate a separate output pulse signal each time the rotating body passes through each one of the at least two fields of view; and a signal processor for receiving each of the output pulse signals from the optical sensor and for rejecting output pulse signals from the optical sensor during a time period indicative of false rotating body information, the signal processor comprising timing means which operates on the output pulse signals from the optical sensor for generating a guard pulse defining a guard time representing said time period indicative of false rotating body information.

2. The apparatus of claim 1 wherein the optical sensor comprises at least two photodiodes associated respectively with the at least two fields of view, the photodiodes generating a pulse signal each time the rotating body passes through the respective field of view.

3. The apparatus of claim 2 further comprising a signal conditioning circuit arranged to receive a signal output from the optical sensor and condition the signal output from the optical sensor to generate an output signal to the signal processor having a pulse amplitude which remains substantially constant in different operating conditions.

4. The apparatus of claim 3 wherein the signal conditioning circuit comprises:

a variable gain amplifier for receiving a signal output from the optical sensor and generating an output signal to the signal processor; and automatic gain control circuitry responsive to the amplitude of output signals from the amplifier to adjust the gain of the amplifier.

5. The apparatus of claim 4 wherein the signal conditioning circuit further comprises:

a sample and hold circuit responsive to the output signal from the variable amplifier for holding a value representing the amplitude of a pulse in the output signal from the amplifier; and a comparator for comparing the value in the sample and hold circuit to a value derived from the output signal from the amplifier, and for outputting a signal to the variable amplifier for adjusting the gain of the amplifier depending on the result of the comparison.

6. The apparatus of claim 1 further comprising a conditioning circuit arranged to receive a signal output from the optical sensor and condition the signal output from the optical sensor to generate an output signal to the signal processor having a pulse amplitude which remains substantially constant in different operating conditions.

7. The apparatus of claim 6 wherein the signal conditioning circuit comprises:

a variable gain amplifier for receiving a signal output from the optical sensor and generating an output signal to the signal processor; and automatic gain control circuitry responsive to the amplitude of output signals from the amplifier to adjust the gain of the amplifier.

8. The apparatus of claim 7 wherein the signal conditioning circuit further comprises:

a sample and hold circuit responsive to the output signal from the variable amplifier for holding a value representing the amplitude of a pulse in the output signal from the amplifier; and a comparator for comparing the value in the sample and hold circuit to a value derived from the output signal from the amplifier, and for outputting a signal to the variable amplifier for adjusting the gain of the amplifier depending on the result of the comparison.

9. The apparatus of claims 1, 2, 3, 4, 5, 6, 7, or 8 wherein the timing means comprises a monostable circuit.

10. The apparatus of claim 9 wherein the signal processor comprises input generator means for generating an input pulse of fixed duration for use by the timing means in generating the guard pulse in response to each pulse in the pulse signal from the optical sensor.

11. The apparatus of claim 10 wherein the input generator means comprises a monostable circuit.

12. The apparatus of claim 10 wherein the timing means comprises a guard pulse generating means which is operable to generate the guard pulse starting at substantially the same time as that of the input pulse.

13. The apparatus of claim 12 wherein the guard pulse generating means comprises a monostable circuit.

14. The apparatus of claim 9 wherein the signal processor comprises:

input generator means for generating an input pulse of fixed duration in response to each pulse in the pulse signal from the optical sensor;

a guard pulse generating means which is operable to generate the guard pulse starting at substantially the same time as that of the input pulse from the input generator means; and an output signal generator for generating an output pulse of fixed duration in response to the guard pulse from the guard pulse generating means.

15. The apparatus of claim 14 wherein each of the input generator means and the guard pulse generating means comprises a monostable circuit.

16. The apparatus of claim 14 wherein the signal processor further comprises an output suppressor coupled to receive the guard pulse from the guard pulse generating means and operable to prevent the output signal generator from generating the output pulse when two or more input pulses from the input generator means are present during the guard time.

17. The apparatus of claim 16 wherein the output signal generator comprises a monostable circuit.

18. The apparatus of claim 16 further comprising a logical AND circuit for generating a logical AND output signal of the input signals from the input generator means and the guard pulse signals from the guard pulse generating means, and the output suppressor comprises a monostable circuit connected to receive the logical AND output signal from the logical AND circuit.

19. A signal processing system comprising:

receiving means operable to receive at least two pulse input signals and to generate at least two output signals representative thereof; and a processing arrangement which is responsive to the at least two output signals from the receiving means for rejecting all of the at least two output pulses which are spaced by less than a predetermined interval.

20. A method of processing signals representing the passage of a body past two sensing devices, the method comprising the steps of:

(a) defining a guard time of a predetermined length; and (b) rejecting signals generated from both of the two sensing devices which are spaced apart to occur within the guard time defined in step (a).

* * * * *